United States Patent [19]
Fackler et al.

[11] Patent Number: 5,729,204
[45] Date of Patent: Mar. 17, 1998

[54] INTELLIGENT CABLE FOR CONTROLLING DATA FLOW

[75] Inventors: James C. Fackler, Boston; Isaac Kohane, Brookline, both of Mass.; Alton C. Liu, Columbus, Ohio

[73] Assignee: Children's Medical Center Corporation, Boston, Mass.

[21] Appl. No.: 389,311

[22] Filed: Feb. 15, 1995

[51] Int. Cl.$^6$ ............................................. H04Q 5/00
[52] U.S. Cl. ........................... 340/825.04; 340/825
[58] Field of Search ................ 340/825.04, 825.05, 340/825.06, 825.07, 825.52, 825; 439/502; 379/56; 370/85.2; 395/182.02

[56] References Cited

U.S. PATENT DOCUMENTS

| | | | |
|---|---|---|---|
| 4,574,284 | 3/1986 | Feldman, et al. | 340/825.52 |
| 4,579,407 | 4/1986 | Shimada | 439/502 |
| 4,674,085 | 6/1987 | Aranguren et al. | 370/85.2 |
| 4,709,365 | 11/1987 | Beale et al. | 395/182.02 |
| 4,807,149 | 2/1989 | Mehnert | 340/825.04 |
| 5,127,041 | 6/1992 | O'Sullivan | 379/59 |
| 5,170,466 | 12/1992 | Rogan et al. | 395/145 |
| 5,294,928 | 3/1994 | Cooper et al. | 341/142 |
| 5,301,350 | 4/1994 | Rogan et al. | 395/800 |

*Primary Examiner*—Edwin C. Holloway, III
*Attorney, Agent, or Firm*—Thomas J. Engellenner; Anthony A. Laurentano; Lahive & Cockfield, LLP

[57] ABSTRACT

A cable that allows a host device to selectively access and communicate with an associated peripheral device by establishing a data communication pathway therebetween. The host device is typically of the type arranged for generating an identifier signal designating a selected peripheral device. The cable includes one or more controllers responsive to the identifier signal designating the associated peripheral device, and establishes a communication pathway between the host device and the selected peripheral device in response to the appropriate identifier signal. The cable further includes a transceiver and a voltage regulator. The transceiver transforms the data signals into a transformed signal having a selected protocol compatible with at least the host device, e.g., RS-232 compatible signals. The voltage regulator supplies operating power to the cable.

5 Claims, 5 Drawing Sheets

INTELLIGENT CABLE FOR CONTROLLING DATA FLOW

BACKGROUND OF THE INVENTION

The present invention relates to a cable and system for coordinating data flow, and more particularly, to a cable and system that coordinate the flow of data between a host device and one or more peripheral devices.

The advent of computers and of information retrieval systems has helped automate various workplaces, particularly those workplaces where the manual recordal of information is common-place, e.g., hospitals. The use of computers in these workplaces allow individuals to create, retrieve, manage, and store vast amounts of data. Additionally, information retrieval systems provide system users immediate access to this data, and allows the user to modify or supplement the data in real time.

Today, hospitals utilize computers in a myriad of ways. Typically, computers are employed to record and to store a patient's medical history, and can be employed to monitor and to assist in the treatment of a patient during convalescence. The excessive speeds and relatively high accuracy with which computers allow hospital personnel to monitor patients, and the system flexibility afforded by conventional information retrieval systems, make them both attractive tools for use in this environment.

Conventional information retrieval systems typically employ a host computer, a data acquisition board, and one or more peripheral devices. The data acquisition board assists the host device in selectively accessing and communicating with a peripheral device. Thus, these boards aid in the management, storage and retrieval of data.

Prior art data acquisition boards typically include a microprocessor and an external memory chip. The microprocessor processes requests from the host device and/or the peripheral device and performs the appropriate data transfer. The external memory module typically stores complex software code that enables the microprocessor to establish the correct communication link between the host and peripheral devices, and to perform various processing tasks. A drawback of these and other prior data acquisition units are that they are relatively bulky and relatively expensive. Another drawback is that the software code developed for and loaded into the external memory module is typically developed by an experienced programmer familiar with sophisticated software. This further increases the overall system cost. Furthermore, the data acquisition board typically provides an excessive number of options or features, since the manufacturer attempts to provide a universal board to meet a myriad of possible uses.

Another drawback of these and other systems is that the data acquisition boards consume relatively large amounts of power, and thus require an external power source to meet and maintain the board's power needs. This excess equipment further adds to the boards overall size.

In view of the foregoing, it is an object of the invention to provide a relatively low cost and relatively compact data retrieval and management system.

Another object of the invention is to provide a cable that controls the flow of data between a host device and a peripheral device.

Still another object of the invention is to provide a cable that is relatively compact and relatively low cost.

Yet another object of the invention is to provide a cable that consumes relatively low amounts of power and is relatively easily integratable with existing devices.

Another object of the invention is to provide a streamlined system devoid of excess features for establishing a communication pathway between a host device and a peripheral device.

Other general and more specific objects of the invention will in part be obvious and will in part be evident from the drawings and description which follow.

SUMMARY OF THE INVENTION

The present invention provides a cable and a system that employs this cable, which allows a host device to selectively access and communicate with an associated peripheral device. Specifically, the cable of the present invention establishes a data communication pathway between a host device and a peripheral device, where the host device is of the type arranged for generating an identifier signal designating a selected peripheral device. According to one aspect of the invention, the cable includes at least one conductor and one or more controllers associated with at least one peripheral device and with the host device, for controlling a flow of data signals therebetween. According to one practice of the invention, the controller is responsive to the identifier signal designating the associated peripheral device, and establishes a communication pathway between the host device and the selected peripheral device in response to the appropriate identifier signal. Furthermore, the host device is of the type arranged for generating the identifier signal to be representative of a value associated with the selected peripheral device.

According to another aspect of the invention, each controller includes a memory element for storing a value representative of an identifier of the associated peripheral device, and a comparison element for comparing the identifier signal generated by the host device with the value stored in the memory elements. When the signal matches the identifier value, the controller establishes a communication pathway between the host device and the selected peripheral device.

According to still another aspect, the cable further includes a transceiver and a voltage regulator. The transceiver, in electrical communication with the controller, transforms the data signals into a transformed signal having a selected protocol compatible with at least the host device, e.g., RS-232 compatible signals. The voltage regulator in electrical communication with the controller supplies operating power to the cable. According to still another practice of the invention, the voltage regulator is configured to receive power from the peripheral device, the host device, or both.

The present invention further provides for a remotely programmable cable for use with a host device and a plurality of peripheral devices. The remotely programmable cable preferably establishes a data communication pathway between the host and peripheral devices. According to one practice of the invention, the host device is arranged for generating an identifier signal indicative of a selected peripheral device, such that the identifier signal is representative of a value associated with the selected peripheral device. In one aspect, the cable includes a memory module for storing identification data representative of an identifier associated with a selected peripheral device, and at least one controller, in electrical communication with the memory module, for controlling a flow of data signals between the host device and the peripheral devices. Each controller is preferably responsive to the identifier signal designating a respective associated one of the peripheral devices for establishing a communication pathway between the host device and the selected peripheral devices.

In another aspect, the controller accesses and retrieves the identification data stored in the memory module, and compares the identifier signal generated by the host device with the identification data stored in memory. The controller then selectively responds to the comparison by establishing a communication pathway between the host device and the selected peripheral device when the identifier signal matches the identification data, thereby allowing the data signals to be passed therebetween. According to another practice of the invention, the remote memory module is configured to be remotely and/or locally programmable, e.g., via a remote programming module.

According to another aspect, the cable further includes a transceiver in electrical communication with at least one controller for transforming data signals into transformed signals having a selected protocol compatible with the host device. According to still another aspect, the cable includes a voltage regulator in electrical communication with at least one controller for supplying power thereto. According to still another practice of the invention, the voltage regulator is configured to receive power from the peripheral device, the host device, or both.

The present invention further provides a system for allowing a host device to access and to communicate with one or more selected peripheral devices among a plurality of peripheral devices. According to one aspect, the system comprises one or more cables, each coupled to a peripheral device and to the host device, for controlling a flow of data therebetween. According to one practice of the invention, the host device includes a selection element for generating an identifier data signal indicative of a selected peripheral device. Additionally, each cable preferably includes at least one controller having a resident memory element for storing identification data representative of the peripheral device attached to the cable, and a comparison element for comparing the identifier signal generated by the host device with the identification data stored in the resident memory means. In one aspect, the controller establishes a communication pathway between the host device and the selected peripheral device when the identifier signal matches the identification data, thereby allowing data to be passed therebetween.

According to another aspect, the system includes a remote transceiver, in communication with at least one of the cables and with the host device, for translating the data signals flowing therebetween into a transformed data signal compatible with the host device. The remote transceiver preferably includes a power element for selectively supplying power to the plurality of cables.

According to still another aspect, the cable of this system further includes a local transceiver in electrical communication with the controller for transforming a data signal into a transformed signal having a selected protocol compatible with the host device and/or the peripheral device. The system further includes a voltage regulator in electrical communication with the controller for supplying power to the controller. According to still another practice of the invention, the voltage regulator is configured to receive power from the peripheral device and/or the host device.

The present invention further provides for a remotely programmable system for allowing a host device to access and to communicate with one or more selected peripheral devices among a plurality of peripheral devices. The system preferably includes one or more cables coupled with a respective associated one of the peripheral devices and with the host device, for controlling a flow of data therebetween. The host device preferably includes a selection element for generating an identifier data signal indicative of a selected peripheral device.

According to one aspect, the system includes a plurality of memory modules, each coupled with a respective associated one of the cables, for storing selected identification data representative of a selected peripheral device. According to another aspect, each cable includes at least one controller having means for accessing and retrieving the identification data stored in memory, and a comparison element for comparing the identifier signal generated by the host device with the identification data. Preferably, the controller establishes a communication pathway between the host device and the selected peripheral device when the identifier signal matches the identification data.

The remotely programmable system further includes a remote transceiver, in communication with at least one of the cables and with the host device, for translating the data signals flowing therebetween into a transformed data signal compatible with the host device. In another aspect, the remote transceiver includes a power element for supplying power to the plurality of electrical cables.

According to other aspects of the invention, the cable further includes a local transceiver in electrical communication with the controller for transforming the data signal into a transformed signal having a selected protocol compatible with the host device and/or the peripheral device. The system also includes a voltage regulator in electrical communication with the controller for supplying power thereto.

These and other aspects of the invention are evident in the drawings and in the description which follows.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention and, although not to scale, show relative dimensions.

DESCRIPTION OF ILLUSTRATED EMBODIMENTS

Figure 1:
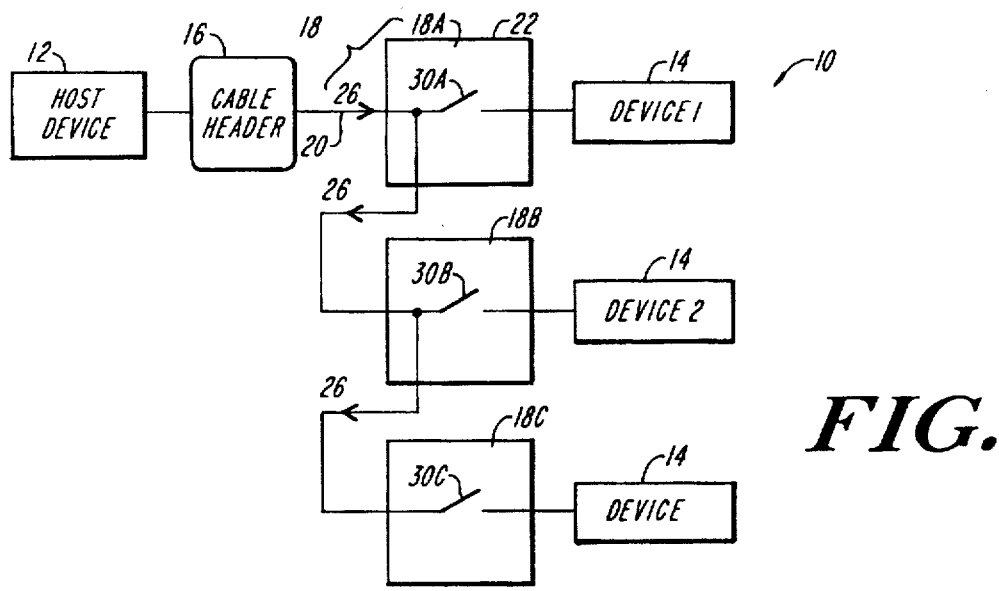
FIG. 1 is a schematic block diagram of a data control system of the invention illustrating the data connection pathways between a host device and one or more peripheral devices.
Figure 2:
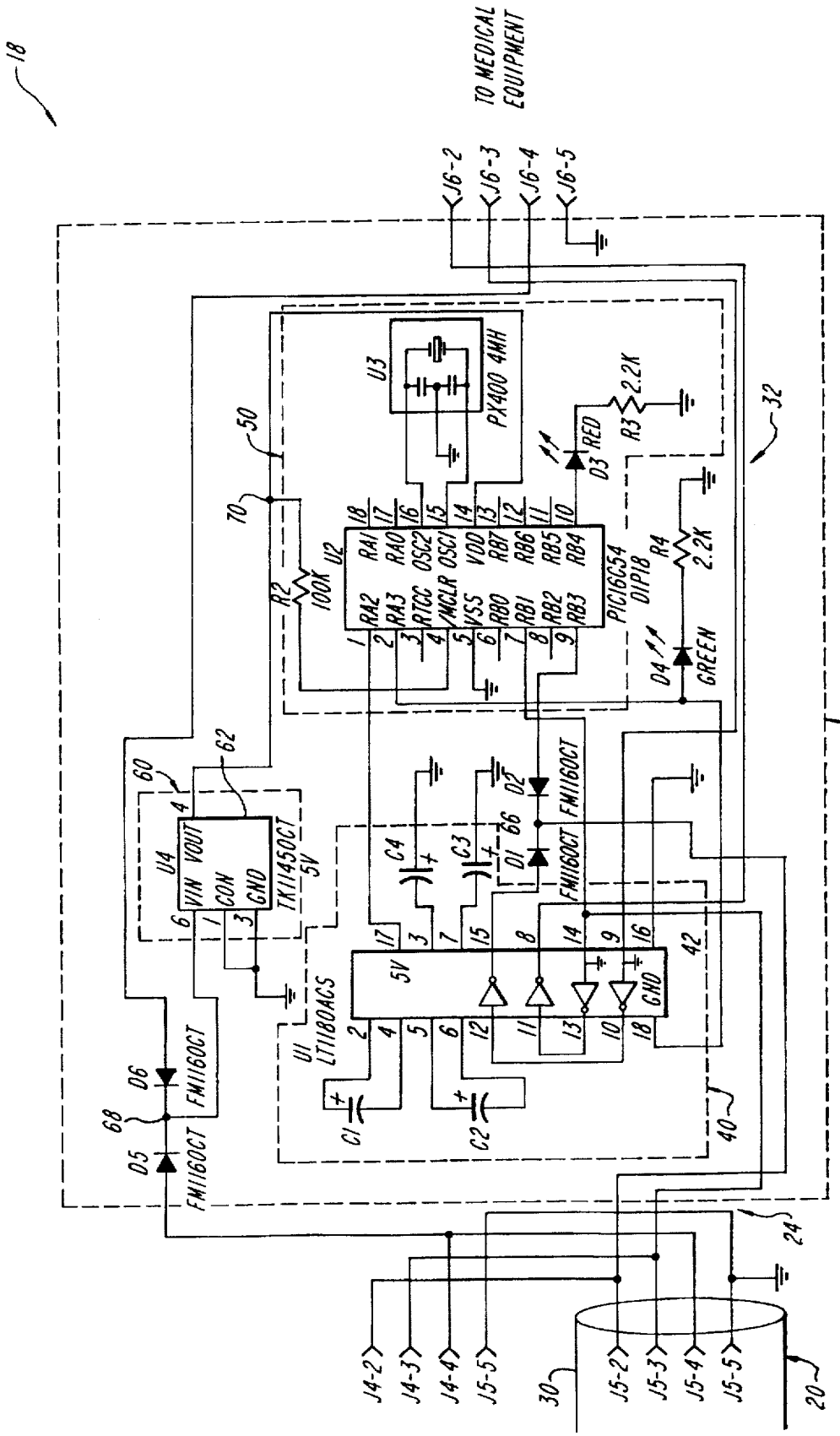
FIG. 2 is a schematic circuit illustration of the cable of FIG. 1 according to one embodiment of the invention.
Figure 3:
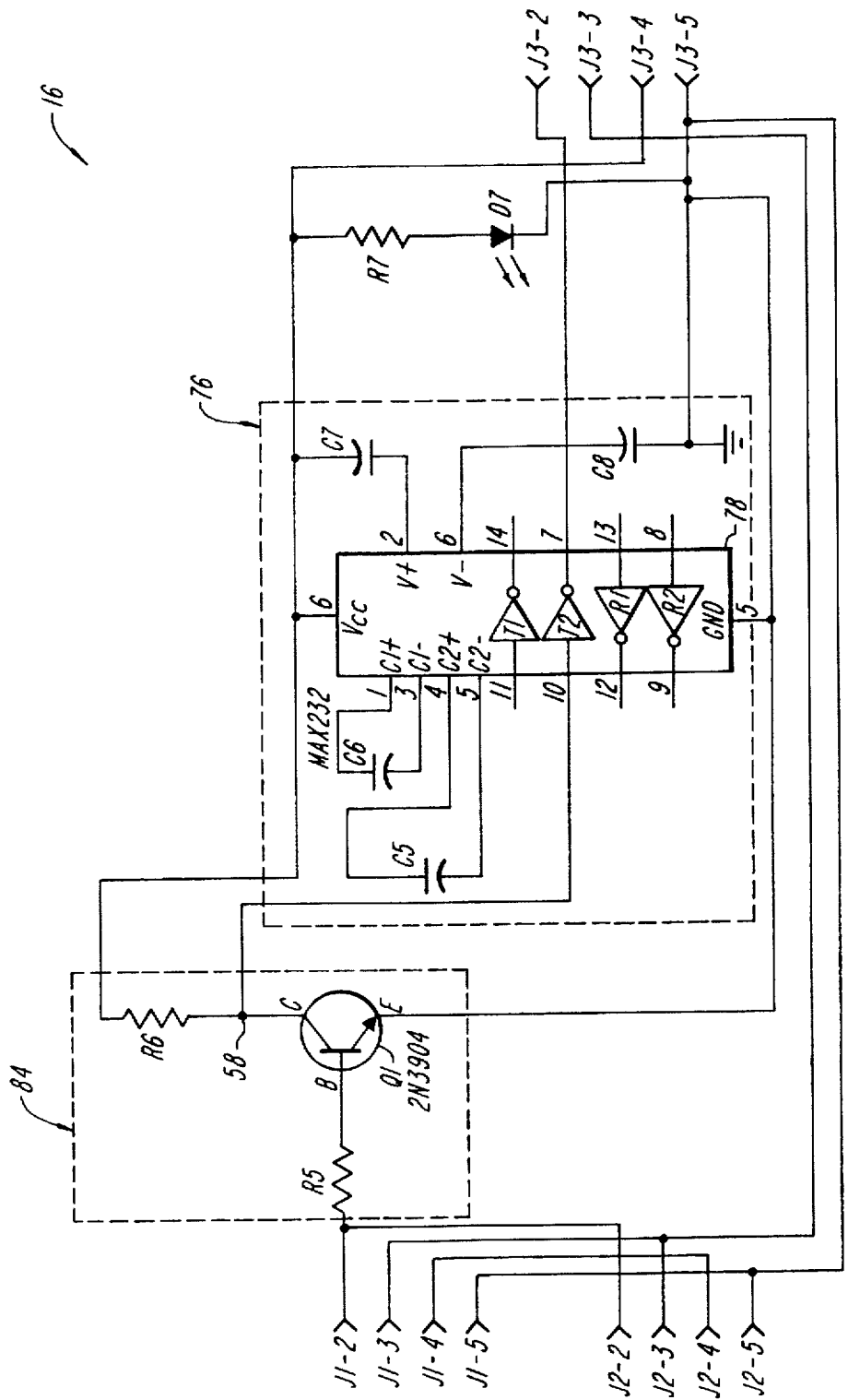
FIG. 3 is a schematic circuit illustration of the cable header of FIG. 1 according to one embodiment of the invention.
Figure 5:
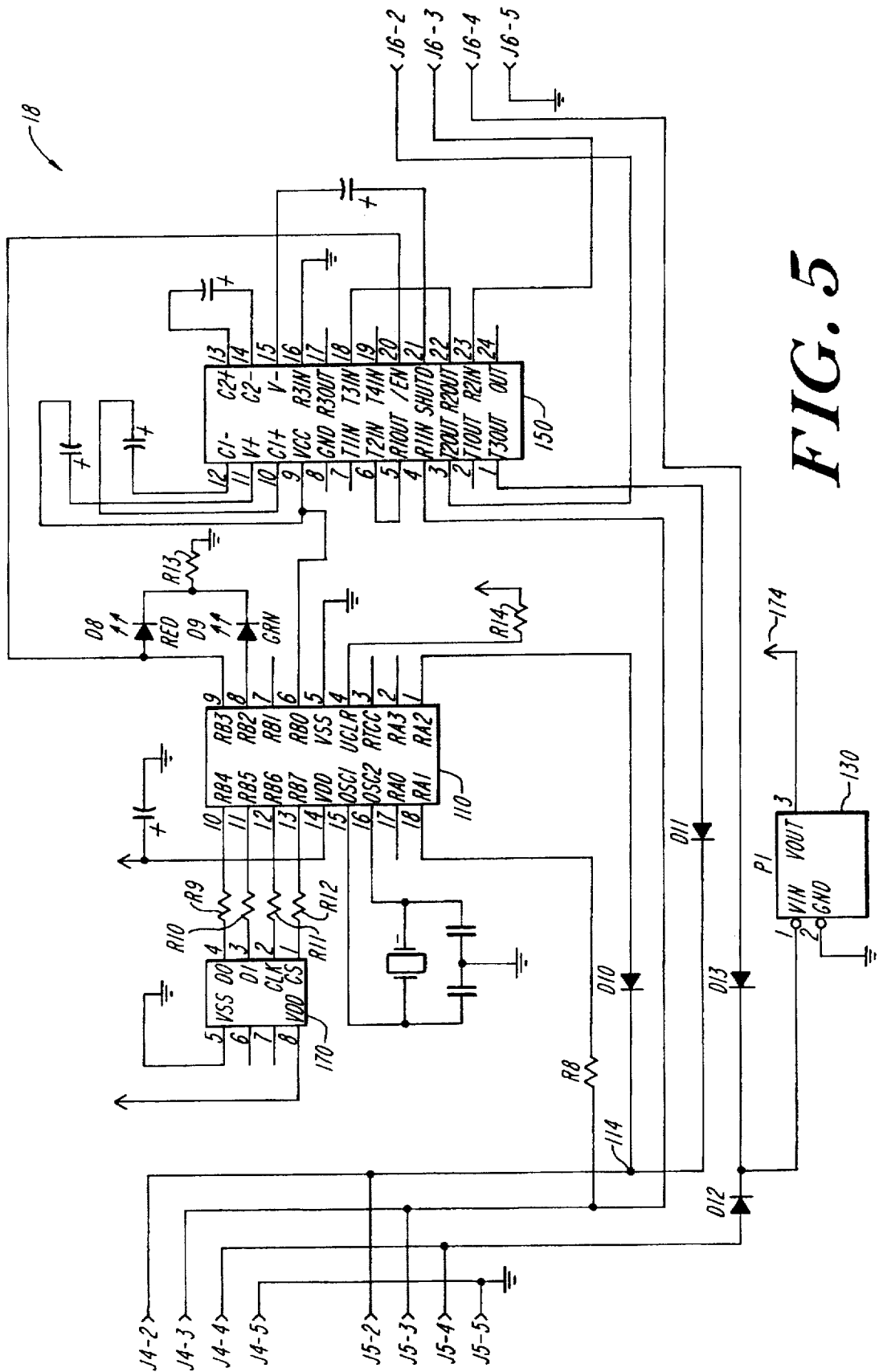
FIG. 5 is a schematic circuit illustration of a remotely programmable cable according to another embodiment of the invention.

FIG. 1 illustrates the data control system 10 of the present invention. The system 10 includes a host device 12 that is connected to a plurality of peripheral devices 14, designated as device 1, device 2, and device n, by a cable header 16 and a plurality of daisy-chained cables 18, connected as shown. The cables 18 include an elongate, flexible main body 20 and a cable connector or housing 22. The cable 18 can be of any suitable cable type, such as fiber optic or electrical, and is preferably an electrical cable. The illustrated electrical cable main body 20 includes one or more conductors that are covered by an electrical insulating material 30, FIG. 3. The cable housing 22 preferably houses the associated data flow control circuitry (FIGS. 2, 3 and 5). In an alternate embodiment, the associated circuitry can be mounted within the insulating layer 30, thus eliminating the need for the cable housing.

The cable 18 coordinates the flow of data between the host device 12 and the peripheral devices 14 by establishing a selected data pathway between the host device and a particular peripheral device. Referring to FIG. 1, and by way of example, an input data signal 26 generated by the host computer 12 is transferred via the cable header module 16 to the cables 18A–18C in the daisy-chained array of electrical cables. The first cable 18A can either establish a data pathway between the host device 12 and peripheral device 1, or can transfer the signal 26 to the next sequential cable 18B in the daisy-chained array. Thus, the cables 18A–18C operate, illustratively, in a manner similar to an electronic switch, shown as switches 30A–30C. For example, the cable 18A can establish a data pathway between the host device 12 and peripheral device 1 by "closing" switch 30A. The data signal 26 is then transferred to the peripheral device 1. Furthermore, data from device 1 can be transferred to the host device 12 along the same data pathway, thus establishing a bi-directional communication pathway between the host device and the peripheral device.

Conversely, when the cable 18A disposes the switch in the "open" position (as shown), no communication pathway between the host 12 and peripheral device 1 is established, and the signal 26 is transferred to the next daisy-chained cable 18B. Likewise, the cable 18B can establish a communication pathway between the host device 12 and peripheral device 2, or the input signal 26 can be transferred to cable 18C. Cable 18C also functions as a switch 30C and can establish a communication pathway between the host device 12 and peripheral device 3.

FIG. 2 is a schematic circuit illustration of the cable 18 of FIG. 1. The cable main body 20 includes a plurality of conductors, e.g., J5-2 through J5-5, surrounded by an insulating layer 30. The cable can be a modular cable, such as an IDC modular cable assembly, commercially available from DIGI-KEY, and which is known to the ordinarily skilled artisan. The illustrated cable housing 22 preferably encloses the illustrated cable circuitry 32, and is attached to one end of the cable main body 20. The input conductors J5-2 through J5-5 transfer data signals between the host device and the cable circuitry 32. The cable circuitry, in turn, transfers data signals to or receives data signals from one or more peripheral devices via output conductors J6-2 through J6-5. The illustrated conductors J4-2 through J4-5 are connected in a daisy-chain manner with conductors J5-2–J5-5, and preferably carry the input data signals to the next attached cable in the series, FIG. 1. This daisy-chained topology allows the input signal transmitted by the host device 12 to appear at the cable interface 24 of each cable in the daisy-chained array.

The illustrated circuitry 32 includes a transceiver stage 40, a controller stage 50, and a voltage regulation stage 60. The controller stage 50 and the transceiver stage 40 establish a communication pathway between a host device and a selected peripheral device while maintaining appropriate signal protocol during data transfer. For example, data signals transferred to the peripheral device or received by the host computer typically have an RS-232 protocol. The controller stage 50 can be a conventional microcontroller integrated circuit 52, such as a commercially available PIC16C54 chip manufactured by Microchip Technology, Inc., U.S.A. (i.e., a CMOS microcontroller). Those of ordinary skill will readily recognize that any suitable microcontroller can be employed in the illustrated cable circuitry. Similarly, the transceiver stage 40 can be a conventional transceiver integrated circuit 42, such as a commercially available LT1180ACS manufactured by Linear Technology, U.S.A. Those of ordinary skill will recognize that any suitable RS-232 transceiver can be employed. The illustrated controller chip 52 is an 8-bit, fully static, EPROM-based microcontroller that employs a RISC-like architecture. Specifically, the microcontroller includes an EPROM, RAM, and a central processing unit that drives the controller. The illustrated chip 52 requires relatively low amounts of power to operate.

The resident EPROM of the microcontroller preferably has stored thereon software code that operates the controller 52 according to a selected program sequence. The software code can be loaded onto the EPROM of the controller in the conventional manner, known to those of ordinary skill. The software code stored in the memory of the controller and utilized in conjunction with the present invention, is set forth at the end of the specification as software listing A. The construction of this program follows from principles and teachings generally known in the art of electrical engineering and computer engineering, and thus is considered within the scope of one of ordinary skill in this art. Additions, modifications, and subtractions in the illustrated program steps can be made by one of ordinary skill without departing from the spirit and scope of the invention.

The integrated circuit 52, e.g., the PIC16C54 chip, and the circuit 42, e.g., the transceiver, are provided with the following terminal connections, as explained in the circuit specification manuals distributed by Microchip Technology, Inc. and Linear Technology, respectively, and which are readily and easily obtainable by one of ordinary skill in the art. The terminal connection or PIN 1 of the microcontroller chip 52 is connected to PIN 17 of the transceiver chip 42. The microcontroller supplies an operating level of voltage, e.g., about 5 V dc, to the transceiver 42 by way of PIN 1. The microcontroller PIN 2 (an I/O port) is connected to PIN 18 of the transceiver 42. PIN 18 is an ON/OFF pin and thus controls the operational mode of the transceiver. For example, a logic low, e.g., 0 volts, placed at PIN 18 and supplied by PIN 2 of the controller 52, places the transceiver in the shutdown or disabled mode, thereby reducing the necessary operational input supply power to zero. Conversely, a logic high, i.e., 5 volts, at PIN 2 of the controller 52 and placed at PIN 18 of the transceiver 42 enables or turns on the transceiver. According to one practice of the invention, the transceiver chip 42 is normally disposed in the shutdown mode (normally-disabled) until enabled by the microcontroller chip 52.

Signal input PIN 7 of the microcontroller is connected to PIN 14 (the receiver signal input terminal) of the transceiver chip 42, which accepts input signals having appropriate RS-232 voltage levels. PIN 9 of the controller 52 is electrically coupled to the anode of diode D2, the cathode of which is connected to circuit junction 66. Likewise, PIN 15 of the transceiver chip 42 is connected to the anode of diode D1, the cathode of which is also connected to circuit junction 66. The illustrated junction 66 is further connected to electrical conductors J5-2 and J4-2, which are electrically coupled to conductors J1-2 and J2-2, FIG. 3. The particular connections between the electrical conductors will be described in greater detail below. According to one practice of the invention, PIN 15 of the transceiver 42 generates an output signal (originally transmitted by the host device) having the appropriate RS-232 voltages when the transceiver is enabled, for example, by placing a logic high at PIN 18.

PIN 5 of the controller 52 is connected directly to ground. PIN 9 of the microcontroller also generates an output acknowledgment signal that is transferred through diode D2 to circuit junction 66. Diodes D1 and D2 thus allow multiple signal sources to transmit output signals along a common line by electrically isolating the signals from each other. Thus, the diodes D1 and D2 function as unidirectional gates, allowing only a selected signal to pass therethrough.

PINS 15 and 16 of the controller 52 are electrically connected to a ceramic crystal, designated as U3, having a pair of built-in capacitors. The crystal establishes the clock frequency of the controller, and is preferably between about 2 MHz and 6 MHz, and most preferably about 4 MHz. Establishing the clock frequency at 4 MHz operates the controller at 9600 baud. PIN 10 of the controller 52 is connected to the anode of a red light-emitting diode (LED) D3, the cathode of which is connected to ground through current-limiting resistor R3. Similarly, the output of PIN 2, e.g., the high/low voltage level output, is also connected to the anode a green light-emitting diode (LED) D4, the cathode of which is connected to ground through current-limiting resistor R4. The diode D3 provides a visual indication that the cable 18 is disposed in the inactive mode (transceiver disabled), thus blocking any communication between a host device and a selected associated peripheral device. Conversely, diode D4 provides a visual indication that the cable 18 is in an active mode (transceiver enabled), thus establishing a communication pathway between the host device and the associated peripheral device.

Referring again to FIG. 2, the illustrated transceiver chip 42 is a dual RS-232 driver/receiver having a dual charge pump network that produces appropriate RS-232 voltage levels, e.g., between ±9 volts. PIN 3 of the transceiver is connected to one end of storage capacitor C4, the other end of which is connected to ground. Capacitor C4 stores an appropriate level of positive RS-232 voltage, e.g., about +9 V. Thus, PIN 3 essentially functions as the positive RS-232 voltage supply for the RS-232 driver portion of the transceiver 42. PIN 4 of the transceiver is connected to one end of storage capacitor C3, the opposite end of which is connected to ground. The storage capacitor C3 stores an appropriate level of negative voltage, e.g., about −9 V, in the illustrated topology. Hence, PIN 3 essentially functions as the negative RS-232 voltage supply for the RS-232 driver portion of the transceiver 42.

PIN 8 of the transceiver is electrically coupled to the output conductor J6-2, and selectively generates an RS-232 level output signal that is transferred to the associated peripheral device along conductor J6-2, as will be described in greater detail below. PIN 9 is a receiver input terminal and is electrically coupled to conductor J6-3. PIN 16 is the ground pin and is connected directly to ground. PINS 8 through 15 operate to alternately transform RS-232 voltage levels to TTL logic levels and vice versa. For example, an RS-232 input voltage disposed at the receiver input PIN 14 is transformed to a TTL signal at PIN 13.

PIN 13 is directly coupled to PIN 11, a TTL-compatible driver input pin, and the TTL voltage is again transformed to an RS-232 voltage level at PIN 8, a driver output terminal. Likewise, an RS-232 signal disposed at PIN 9, typically generated by the associated peripheral device, is transformed to an appropriate logic level at PIN 10, e.g., one of the receiver output terminals. This terminal is directly coupled to the RS-232 driver input PIN 12 which is compatible with TTL voltage levels. The TTL voltage is again transformed to an RS-232 voltage at PIN 15. The illustrated inverter symbols of the transceiver 42 indicate the direction in which the data signals are processed thereby, and further indicate that the input terminal voltage levels are reversed. By way of example, a positive 9 volt signal at PIN 14 is transformed to a TTL logic low, e.g., about 0 volts at PIN 13. Conversely, a negative 9 volts at PIN 14 produces a logic high, e.g., about 5 volts, at PIN 13.

PIN 2 of the transceiver 42 is coupled to PIN 4 through storage capacitor C1, and PIN 5 is coupled to PIN 6 through storage capacitor C2. Capacitors C1 and C2 constitute a part of the charge pump network of the transceiver, and allow the enabled transceiver to generate appropriate voltage levels in response to signals applied to the receiver input terminals 9 and 14.

With further reference to FIG. 2, the voltage regulation stage 60 can be an integrated circuit 62, such as a TK11450CT chip manufactured by TOKO America, Inc., Mount Prospect, Ill., U.S.A. The voltage regulator produces a 5 volt dc output signal that supplies power to the controller stage 50. The voltage regulator chip 62 is provided with the following terminal connections.

PIN 6 of the regulator 62 is connected to circuit junction 68, which is connected to the cathode of isolation diodes D5 and D6. The anode of diode D6 is connected to conductors J6-4, and the anode of diode D5 is connected to conductors J4-4 and J5-4. Conductor J6-4 is connected to a remote positive voltage power source, typically associated with the attached peripheral device. Likewise, conductors J4-4 and J5-4 are connected to another remote power source, such as a power pack coupled to the cable header of FIG. 3, or to the power supply line of the host device.

The isolation diodes allow multiple power sources to power the voltage regulator 62. For example, power supplied by the attached peripheral device along conductor J6-4 and through diode D6 is applied to the power input terminal (PIN 6) of the regulator 62. Since diode D5 is reverse-connected, this power signal does not travel along conductors J4-4 and J5-4. As a secondary feature, and according to another practice of the invention, power can be supplied along either/both conductors J4-4 and/or J5-4 through diode D5 to the power input PIN 6. The reverse-connected diode D6 prevents power from traveling along conductor J6-4. Consequently, the isolation diodes allow multiple sources to power the voltage regulator along the same power line, illustrated as circuit junction 68.

The voltage regulator 62 maintains the controller 52 in the normally-enabled mode by providing a constant power supply at the power input PIN 4 of the controller 52. The voltage regulator 62 helps protect the controller 52 from unwanted electrical noise and over-voltages by supplying a relatively clean, constant level of voltage, e.g., 5 volts, to the controller, thus eliminating the need for connecting the controller to alternate, potentially deleterious power sources.

Referring again to FIG. 2, PINS 1 and 3 of the voltage regulator 62 are coupled to ground, and the voltage output terminal (PIN 4), which generates an output voltage level of about 5 volts, is coupled to circuit junction 70. Circuit junction 70 is connected to PIN 4 of the controller 52 through current-limiting resistor R2, and is further coupled to the controller input power terminal (PIN 14). The voltage regulator 62 supplies the necessary operating power to the control stage 50 via this connection.

The transceiver 42 and the controller 52 operate in conjunction with one another to selectively access the peripheral device associated with the cable 18. The illustrated electrical components further selectively allow for the transfer of data between the host device and the peripheral device. The transceiver further converts or transforms TTL CMOS logic levels typically generated by the controller 52 into RS-232 voltage levels compatible with both the host and peripheral devices. The operational interrelationship between the illustrated components, e.g., the controller 50, the transceiver 40, and the voltage regulator 60, will be described in further detail below.

With reference to FIG. 3, the illustrated cable header 16 includes a second transceiver stage 76 and an inverter stage 84. The second transceiver stage 76 includes an integrated chip 78, and storage capacitors C5 through C8. The integrated chip 82 is a conventional transceiver chip, such as an RS-232 transceiver manufactured by Maxim Integrated Products, U.S.A. The integrated circuit 78 is provided with the following terminal connections, in accord with the specification sheets distributed by Maxim Integrated Products, and which are readily and easily attainable by one of ordinary skill in the art. The illustrated integrated circuit has a combined line driver/receiver that is compatible with RS-232 communication interfaces. The integrated circuit has a built-in charge pump, voltage converter that converts a selected input voltage level, e.g., about 5 volts, into RS-232 compatible voltage levels, e.g., between about ±9 volts.

PIN 1 of the second transceiver 78 is coupled to PIN 3 thereof through storage capacitor C6, and PIN 4 of the transceiver is coupled to PIN 5 through storage capacitor C5. Capacitors C5 and C6 are employed in the charge pump network of the transceiver 78, and thus generate the necessary RS-232 voltage levels.

The inverter stage 84 includes a transistor Q1 and biasing resistors R5 and R6. The base of transistor Q1 is coupled to bias resistor R5, the other end of which is coupled to conductors J1-2 and J2-2. The collector of transistor Q1 is connected to one terminal end of resistor R6. The opposite terminal end of resistor R6 is connected to PIN 2 (the V positive terminal) of chip 78 through storage capacitor C7; to the Vcc PIN of chip 78; and to the power supply conductor J3-4. Conductor J3-4 transfers power to the cable header from the host device, as well as to the voltage regulator 62, FIG. 3. The collector of transistor Q1 is further connected to PIN 10 of chip 78. The emitter of transistor Q1 is connected to the ground terminal (PIN 5) of chip 78 and to the ground conductor J3-5. The ground conductor J3-5 is also connected to conductors J1-5 and J2-5, which in turn are connected to conductors J4-5 and J5-5.

The illustrated cable header 16 operates in conjunction with the cable 18 to convert signals having TTL voltage levels into RS-232 voltage levels compatible with the host device. Additionally, the cable header supplies back-up, emergency power to the cable 18 in circumstances where the host device is unable to, for example, during a power failure.

Referring again to FIG. 3, the current-limiting resistor R7 is connected to the anode of light-emitting diode D7 and to one terminal end of resistor R6. The cathode of diode D7 is connected to ground. Diode D7 provides a visual indication that the cable header is receiving power and is operational. PIN 6 (the V negative terminal) is coupled to one end of storage capacitor C8, the opposite end of which is connected to ground. Output signal PIN 7 of chip 78 is coupled to the output signal conductor J3-2, which transfers signals from the cable header to the host device 12.

The illustrated conductors J1-2 through J1-5, J2-2 through J2-5, J3-2 through J3-5, J4-2 through J4-5, J5-2 through J5-5, and J6-2 through J6-5, are coupled as shown in FIGS. 2 and 3. Referring to FIG. 3, the input signal conductor J3-3 transfers output signals from the host device 12, FIG. 1, to the cable 18 via conductors J1-3 and J2-3, which are coupled to conductors J4-3 and J5-3, respectively. Conductors J4-3 and J5-3 are in turn coupled to the input signal PIN 14 of the transceiver chip 42, and to the input signal PIN 7 of the controller 52. The output signal PIN 8 of the transceiver 42 transfers signals to the peripheral device coupled to the cable along conductor J6-2.

The signals generated by the peripheral device are transferred along conductor J6-3 to the second data input PIN 9 of the transceiver 42. Conductors J5-2 and J6-2 transfer signals from the output terminals PIN 15 and PIN 9 of the transceiver and controller, respectively. The conductors J6-5, J5-5 and J4-5 are connected to ground. Additionally, the conductors J4-4 and J5-4 selectively transfer power from the cable header and/or host device to the voltage regulator stage 60. Likewise, the peripheral device J6-4 selectively supplies power to the voltage regulator 60 along conductor J6-4.

Referring to FIG. 3, the output signals of the controller 50 and transceiver 40 are transferred to the cable header 16 along conductors J1-2 and J2-2. Further, conductors J1-3 and J2-3 are coupled to input conductor J3-3, and transfer output signals from the host device 12 to the cable 18.

The particular conductor circuit connections and the function of the terminals of the transceiver chip 42 and the controller chip 52 are fully summarized in Tables 1, 2, and 3 below.

TABLE 1

| Cable Header Conductor Connections | |
|---|---|
| CONDUCTOR | DESCRIPTION |
| J1-2 J2-2 | Transfer signal output from cable to cable header |
| J1-3 J2-3 | Transfer signal output from host computer to cable |
| J3-3 | |
| J1-4 J2-4 | Transfer power to the voltage regulator |
| J1-5 J2-5 J3-5 | Ground conductors |

TABLE 2

| Cable Conductor Connections | |
|---|---|
| CONDUCTOR | DESCRIPTION |
| J4-2 J5-2 | Transfer signal output from cable, e.g., verification message or data from peripheral device to cable header for subsequent transfer to the host device |
| J4-3 J5-3 | Transfer signal output from host computer to cable |
| J4-4 | Power from cable header and/or host device for use |

TABLE 2-continued

Cable Conductor Connections

| CONDUCTOR | DESCRIPTION |
|---|---|
| J5-4 | by voltage regulator |
| J4-5 | Ground conductors |
| J5-5 | |
| J6-5 | |
| J6-2 | Transfer output signal from host computer to peripheral device |
| J6-3 | Transfer signal output from peripheral device to host computer |
| J6-4 | Power from peripheral device for use by voltage regulator |

TABLE 3

Pin Connections for Transceiver 42 and Controller 52 of Cable 18

| Chip | Terminal | Description |
|---|---|---|
| Transceiver | 2,4,5,6 | Connections for charge pump capacitors |
| | 7 | Negative RS-232 voltage level output, e.g., -9V. |
| | 8 | RS-232 output to peripheral device |
| | 9 | RS-232 signal input from peripheral device |
| | 10 | TTL logic output (RS-232 signal equivalent from peripheral device) |
| | 11 | TTL logic input |
| | 12 | TTL logic input |
| | 13 | TTL logic output (RS-232 signal output equivalent from host device) |
| | 14 | RS-232 input from host device |
| | 15 | RS-232 output from host device or controller |
| | 16 | Ground |
| | 17 | Power terminal |
| | 18 | Toggle control terminal (enable/disable) |
| Controller | 1 | Power terminal for transceiver |
| | 2 | Output control signal for transceiver |
| | 4 | Clear/Reset |
| | 5 | Ground |
| | 7 | Signal input from host computer |
| | 9 | Signal output from controller to host computer, for transferring a verification signal |
| | 10 | Control for LED D3 |
| | 14 | Power terminal for voltage regulator |
| | 15,16 | Controller internal oscillator |

The controller stage 50 of the cable 18 controls the flow of data between the host device 12 and one or more peripheral devices. The controller coordinates this data flow by monitoring the input data flow from the host device at its interface for a selected identification code associated with each peripheral device, which is stored in memory, e.g., the EPROM, in the controller 50. The correct identification code instructs the controller to establish a data communication pathway between the host device and a peripheral device.

Specifically, the cable electronics receives and transmits data at a current configuration of 9600 baud, 8 bits, no parity, and one stop bit. The identification code transmitted by the host device, e.g., a computer, to each cable interface 24 preferably has a character format of 'XXXXXXXXC.', where the first eight 'X' represent the programmed identification code stored in the memory of one of the cables. The last ASCI character 'C', known as the command character, instructs the cable controller which action to perform. For example, if the command character generated and transmitted by the computer is 'N', the controller proceeds to 'open' a communication channel between the host device and the peripheral device. The command character 'F' instructs the cable to 'close' the communication channel between the host and peripheral device.

In operation, and as shown in FIGS. 1–3, the host computer 12 generates and transmits along a communication line, illustrated as conductors J3-3, J4-3 and J5-3, an identification signal representative of a particular peripheral device. Since the illustrated cables 18A through 18C, FIG. 1, are daisy-chained together, each cable 18 simultaneously monitors the communication line. When the proper identification and command code is received at the interface of a selected cable, the controller of that cable establishes a communication pathway between the host and peripheral devices according to the following sequence.

With reference to FIG. 2, the illustrated transceiver 42 is normally disposed in the disabled mode, thus preventing the host device 12 from communicating with a selected peripheral device associated with a particular cable. The controller 52 is preferably continuously enabled to constantly monitor the input signals traveling along the input conductors for the proper identification code designating a particular peripheral device. The signals generated by the host device and placed at the input terminal (PIN 7) of the controller 52 are compared with the identification code stored in the controller's EPROM. Absent the proper identification code, the normally-disabled transceiver prevents the host device from accessing and communicating with the peripheral device along output conductor J6-2. When the proper identification code is transmitted to the cable interface, and specifically to PIN 7 of the controller, the controller 52 via PIN 2 enables the transceiver 42 by placing a high voltage signal, e.g., 5 volts, at PIN 18 thereof. The enabled transceiver 42 passes subsequent signals transmitted thereto between the host device 12 and a selected peripheral device. For example, if the identification code includes the command code 'N', then the controller and transceiver establish a communication pathway.

The controller stage 50 informs the host device 12 that it has received the proper identification code by transmitting an acknowledgment signal, preferably in the form of 'XXXXXXXXCACK.', to the host device. The acknowledgment signal includes the identification code (denoted by the series of 'X'), the particular command code (either 'N' or 'F'), and the acknowledgment ASCI suffix 'ACK'. The acknowledgment signal exits PIN 9 of the controller 52 and passes along conductor J5-2 and J4-2 through diode D2. The reverse connected diode D1 prevents this acknowledgment signal from accidentally communicating with PIN 15 of the transceiver 42, while allowing the transceiver and the controller to use a common data pathway. The acknowledgment signal allows the system user to verify that a communication pathway has indeed been established between the host device and the selected peripheral device. The absence of this acknowledgment signal indicates that a communication error has occurred, and that no communication pathway between the host and peripheral devices has been established.

Additionally, the logic high formed at PIN 2 of the controller 52 actuates the light-emitting diode D4, causing it to emit green light. The current limiting resistor R4 limits the current passing through the diode, thus providing a sufficient degree of current protection therefor. The diode D4 informs the system user that the transceiver is in the enabled mode, rather than its normally-disabled mode of operation.

The RS-232 compatible, host-generated input signals placed at PIN 14 of the transceiver 42 are converted o TTL voltage levels at PIN 13, are inputted to PIN 11 which accepts TTL compatible voltage signals, and exit PIN 8 at the appropriate RS-232 voltage levels. This output signal is then transferred to the peripheral device by conductor J6-2.

With reference again to FIG. 2, data signals transmitted from the peripheral device to the host device 12 are conveyed back along conductor J6-3 to PIN 9 of the transceiver 42. These data signals are transferred to the transceiver 42 in RS-232 format. The transceiver 42 converts the signal to TTL voltage levels at PIN 10, which is coupled to the TTL-compatible terminal 12. The signal is converted back to RS-232 voltage levels at PIN 15, and is transferred to the cable header along conductor J4-2 and J5-2. The signal passes through diode D1 where the RS-232 voltage levels, typically between ±9 volts, are transformed to a pseudo RS-232 signal that is in the range between about 0 volts and about 9 volts, since the diode blocks negative voltage. As is known to those of ordinary skill, a logic high voltage, e.g., 5 volts, is equivalent to negative 9 volts of RS-232. The reverse-connected diode D2 prevents signals exiting PIN 15 from being placed at PIN 9 of the controller 52.

Referring to FIG. 3, the pseudo RS-232 data signals pass through the biasing resistor R5 and are placed at the base of transistor Q1. When a logic high is placed at the base of transistor Q1, the transistor saturates, pulling the potential of circuit junction 58 of the collector down to the potential of the collector, e.g., ground. Conversely, when a logic low is placed at the base of transistor Q1, the circuit junction 58 is pulled up to the potential disposed at the opposite terminal of R6. This voltage level, which is supplied by the host device, is typically a logic high. Thus, transistor Q1 functions essentially as an inverter.

The circuit junction 58 is coupled to PIN 10 of the transceiver 78. The TTL voltage levels placed at PIN 10 are transformed to RS-232 voltage levels at PIN 7, and the transformed data signals are then transferred to the host device along conductor J3-2.

Similarly, the acknowledgment signal generated by the controller 52 at PIN 9 is typically in the TTL voltage range of about 0 volts to about 5 volts, and is transferred to the host device along conductors J5-2 and J4-2. Since the operational voltage range placed at PIN 9 is positive, diode D2 has no effect on the voltage range. Thus, when a logic high is placed at the base of transistor Q1, a logic low is disposed at PIN 10, and vice versa.

The established communication pathway between the host device and the peripheral device can be closed by having the host device generate the proper command code. For example, an identification signal that contains the proper identification code and the proper command code 'F', instructs the controller to terminate data transmission (or close the pathway) between the host and peripheral devices. When the proper close signal is disposed at PIN 7 of the controller 52, the controller 52 disables the transceiver 42 by placing a logic low at the control terminal (PIN 18) of the transceiver 42. Thus, any signals generated by the host device and placed at PIN 14 are not processed by the transceiver, and thus are not transferred to the peripheral device. Likewise, any signals generated by the peripheral device and disposed at PIN 9 of the transceiver are not processed, and thus also are not transferred to the host device. The red light-emitting diode D7 is then actuated by the controller placing an appropriate voltage level at PIN 10.

Figure 4:
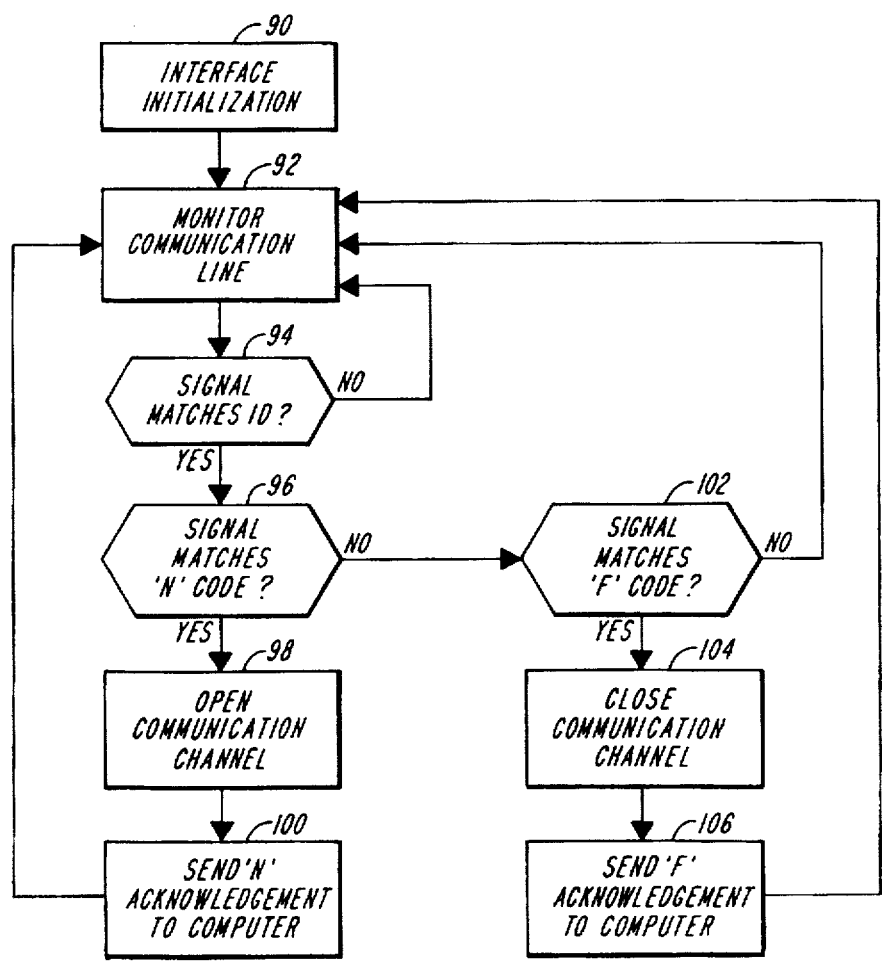
FIG. 4 is a flow chart diagram detailing the preferred process in accordance with the present invention for establishing a signal pathway between a host device and a peripheral device.

FIG. 4 illustrates the initialization, monitoring and activation sequences performed by the software code (see software listing A) resident within the EPROM of the controller 52. As shown, the interface initialization step 90 details the process by which the cable electronics is properly energized. For example, the voltage regulator stage 60 supplies the necessary operating power to the controller 52. The controller then processes the resident software code and proceeds with step 92 of monitoring the input data communication line, e.g., the input conductors J4-3 and J5-3. According to one practice of the invention, the controller 52 monitors all output signals generated by the host computer and placed on the input conductor. The controller monitors these signals by matching the identification code of each received signal with the identification code stored in memory, as shown in step 94. When the received signal matches the identification code stored in the controller's memory, the controller then examines the command code portion of the signal. According to another practice, and as shown in steps 96 and 98, when the command code is the ASCI character 'N', the software code instructs the controller to establish a communication pathway between the host and peripheral devices, as described above in conjunction with FIGS. 2 and 3. In the successive step 100, the controller generates and transmits an acknowledgment signal to the host device to inform the host device and/or the system user that the command code was received.

As shown in steps 102 and 104, when the command code portion of the output signal does not match the ASCI character 'N', the controller determines if the command code matches the ASCI character 'F'. If it does not, the controller continues to monitor the line, as shown in step 92. If the command code matches the character 'F', then the controller terminates the communication pathway between the devices according to step 104. As illustrated in step 106, the controller generates an acknowledgment signal and transfers the acknowledgment signal to the host device, to inform the user that the proper command code was received.

A significant feature of the present invention is that the cable provides a resident controller that selectively establishes a data communication pathway between a host device and a peripheral device. Specifically, the controller includes resident memory that has pre-loaded thereon a selected identification code indicative of a selected peripheral device. The cable, upon receipt of the proper identification code, allows the host device to communicate with the peripheral device. This intelligent cable allows a user to create a communication network that allows access to a selected peripheral device without requiring the creation of complex software to effectuate such an application. Another significant feature is that the cable electronics is extremely compact and small, and can be housed either in the insulation surrounding the conductors, or in a cable connector formed at one end of the cable. Other permutations of this design are intended to be within the scope of this invention.

Still another significant feature of the invention is that the cable is relatively inexpensive, is of relatively small size with low power requirements, and is readily adaptable to various uses.

FIG. 5 is a schematic circuit illustration of a remotely programmable cable according to one embodiment of the invention. The illustrated cable electronics interfaces with the cable header 16 of FIG. 3 in a manner similar to that described above, and further is connected to the various conductors as previously described. The illustrated cable electronics includes a controller 110, a voltage regulator 130, a transceiver 150, and a remote memory module 170, e.g., an EEPROM. The illustrated controller 110 is the same integrated circuit as that shown in FIG. 2. Similar electrical connections have been previously described in relation to FIG. 2, and need not be repeated here.

PIN 18 of the controller 110 is connected to one terminal end of resistor R8, the opposite end of which is connected to conductors J4-3 and J5-3. PINS 10 through 13 are connected through resistors R9 through R12, respectively, to the memory module 170. The memory module 170 is preferably a memory integrated circuit, such as a commercially available EEPROM, such as that manufactured by National Semiconductor Corp., Santa Clara, Calif., U.S.A. The PIN arrangements and functions of the illustrated memory module 170 are known to those of ordinary skill. Specifically, resistor R9 is connected to PIN 4 of the module 170, resistor R10 is connected to PIN 3, resistor R11 is connected to PIN 2, and resistor R12 is connected to PIN 1.

PIN 9 of the controller 110 is connected to the anode of the red light-emitting diode D8, the anode of which is connected to resistor R13. The opposite end of resistor R13 is connected to ground. PIN 9 is further coupled to PIN 20 of the transceiver 150. PIN 8 of the controller 170 is connected to the anode of the green light-emitting diode D9, the opposite end of which is connected to the same terminal end of resistor R13 that diode D8 is connected. PIN 6 of the controller 110 is connected to PIN 9 of the transceiver 150, and PIN 5 is connected directly to ground.

Referring again to FIG. 5, and specifically to the controller 110, PIN 4 is connected to one terminal end of resistor R14, the opposite end of which is connected to the voltage regulator 130 at power connection 174. PIN 1 is connected to the anode of blocking diode D10, the cathode of which is connected to circuit junction 114. This circuit junction is connected to conductors J4-2 and J5-2, as well as to the cathode of blocking diode D11. The anode of diode D11 is connected to PIN 1 of the transceiver 150.

Figure 6:
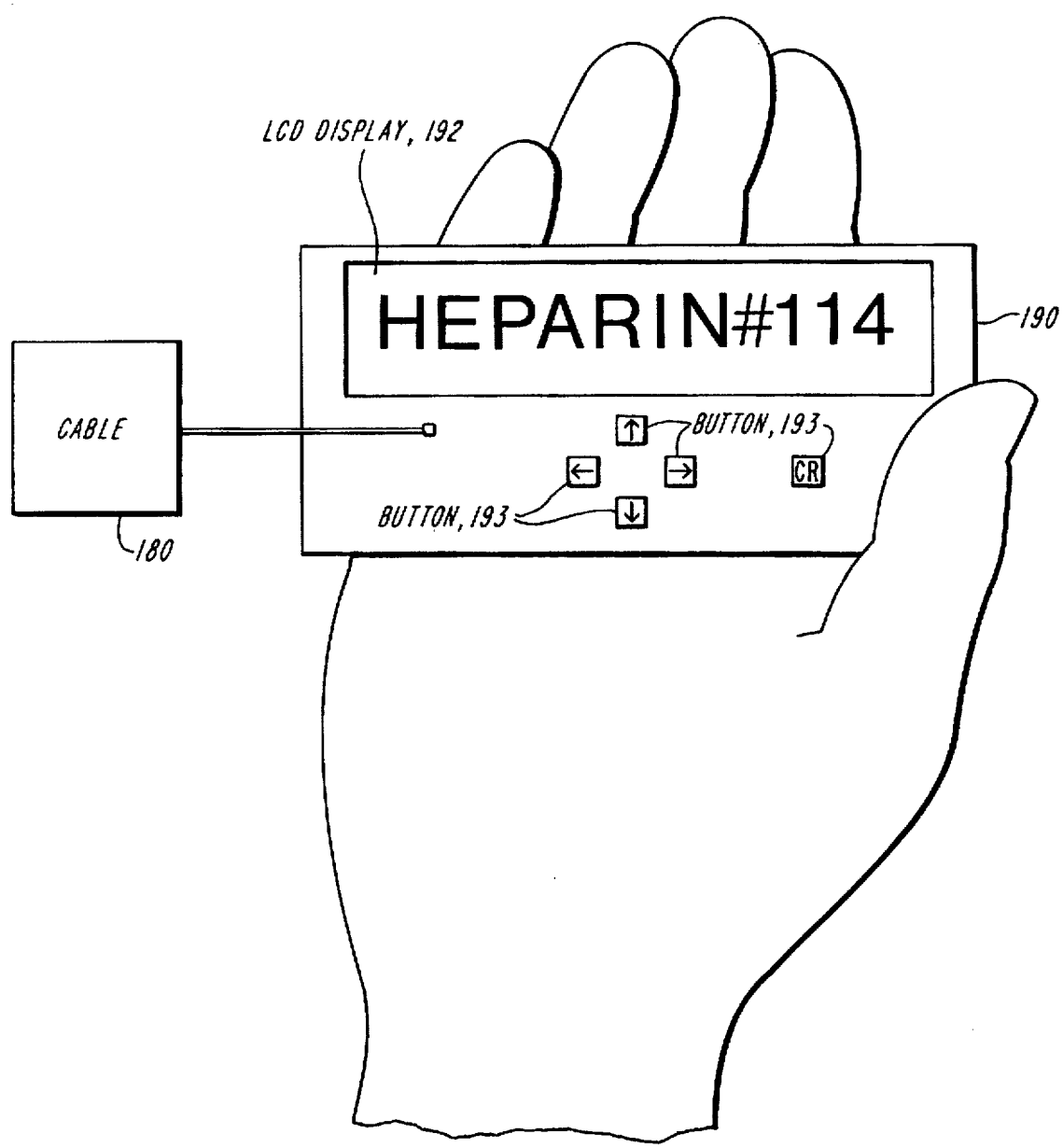
FIG. 6 is a perspective view of a remote programming module for use with the remotely programmable cable of FIG. 5 according to one embodiment of the invention.

The controller 110 preferably establishes a communication pathway between the host device and one or more peripheral devices by comparing data signals inputted by the host device with a selected identification code signal stored in the remote memory module 170. The memory module 170 is preferably programmed in the conventional manner with a selected set of instructions, e.g., software code. According to one practice of the invention, the programmed memory module contains a stored identification code, e.g., a password, that allows access to an attached peripheral device. In this manner, the host device can specifically communicate with a particular peripheral device. According to another practice, the identification code stored in the memory module 170 can be altered or changed by way of a remote hand-held programmer 190, FIG. 6. The programmer 190 provides easy access to the memory module and provides the system user with the requisite flexibility when designing a network system without necessitating the services of an experienced programmer. The illustrated programmer 190 preferably accesses the identification code stored in the remote memory module 170 and displays the codes. The module 190 typically includes an LCD display 192 and a plurality of control buttons 193. The module allows the programmer to select between a number of pre-programmed identification codes, or can allow the user to customize the cable password by selecting a unique identifier and storing it in the memory module 170.

The memory module preferably has stored thereon software code that operates the controller according to a selected program sequence. The software code can be loaded onto the module in the conventional manner, known to those of ordinary skill. The software code stored in the memory of the controller and utilized in conjunction with the present invention, is set forth at the end of the specification as software listing B. The construction of this program follows from principles and teachings generally known in the art of electrical engineering and computer engineering, and thus is considered within the scope of one of ordinary skill in this art. Additions, modifications, and subtractions in the illustrated program steps can be made by one of ordinary skill without departing from the spirit and scope of the invention.

The memory module 170 has the following additional PIN connections. PIN 5 of the module 170 is connected directly to ground. PIN 8 is connected to the power connection 174 of the voltage regulator.

The illustrated voltage regulator 130, manufactured by National Semiconductor Corp., of Santa Clara, Calif., U.S.A., operates in a manner similar to the voltage regulator described above in connection with regulator 60 of FIG. 2. PIN 1 of the regulator 130 is connected to the cathode of blocking diodes D12 and D13. The anode of diode D12 is connected to the power conductors J4-4 and J5-4. Power is preferably transferred to the voltage regulator along this conductor from the host device or from the cable header 16, FIG. 3. The anode of diode D13 is connected to conductor J6-4, which in turn is connected to the power supply of the peripheral device. Blocking diodes D12 and D13 allow different power sources to provide power to the voltage regulator along the same line without interfering with one another. PIN 2 of the regulator is connected directly to ground. The power output terminal (PIN 3) is connected to circuit power junction 174, which provides power to the illustrated electrical components of the cable 18.

With further reference to FIG. 5, the illustrated transceiver 150 is similar in operation to the transceiver described above in conjunction with FIG. 2. The transceiver 150 is commercially available under the tradename MAX236, and is manufactured by Maxim Integrated Products, U.S.A. Terminal connections that are similar in operation to those described in relation to the transceiver 42 of FIG. 2, also manufactured by Maxim Integrated Products, need not be described further below. The additional PIN connections are as follows.

PIN 5 of transceiver 150 is connected directly to PIN 6. PIN 4 is connected to the conductors J4-3 and J5-3, as well as to one terminal end of resistor R8. PIN 3 is connected to the output signal conductor J6-2. PIN 16 is connected directly to ground, and PIN 18 is connected to PIN 22. PIN 23 is connected to the input signal conductor J6-3.

The operation of the cable 18 of FIG. 5 is similar in operation to the cable of FIG. 2, except that the identification code, previously stored in the resident EPROM of the controller 52 of FIG. 2, is now stored in the remote memory module 170. Thus, the controller accesses and retrieves this data from the remote memory, as shown. Additionally, the illustrated circuit topography of FIG. 5 allows a user to interface directly with the memory module 170 to alter the stored identification code or to create additional code within the memory.

In operation, the host device transmits data signals at a current configuration of 9600 baud, 8 bits, no parity, and 1 stop bit, in a format similar to that described above, to the cable 18 along conductors J3-3, J4-3 and J5-3. The signal is connected to input PIN 18 of the controller 110, as well as to input PIN 4 of the transceiver 150. The transceiver 150, which is normally-disabled, does not process this signal absent instructions from the controller 110. When the input signal matches the proper identification code, e.g., password, stored in the EEPROM, and which designates the attached peripheral device, the controller 110 places a logic high, e.g., 5 volts, at PIN 8, and a logic low at PIN 9. The logic high at PIN 8 actuates the light-emitting diode D9, and the logic low at PIN 9 enables the transceiver 150 via PIN 20, while concomitantly deactivating the light-emitting diode D8. The activation of diode D9 informs the system user that the cable is enabled, and that a communication pathway between the host and selected peripheral devices has been established.

The controller 110 transmits a verification signal to the host device, acknowledging receipt of the proper identification code, as well as receipt of the selected command code, e.g., the ASCI character 'N' for formation of a data flow channel or the ASCI character 'F' signifying closure of the channel. This acknowledgment signal exits PIN 1 of the controller and is outputted to the cable header, FIG. 3, and thus to the host device along conductors J4-2 and J5-2.

With the verification signal sent by the controller and received by the host device, any subsequent signals placed at the input terminal (PIN 4) of the transceiver 150 are transferred to the peripheral device attached to this particular cable. The input signals are typically RS-232 compatible, and are converted to TTL levels at PIN 4, which is connected to the TTL input terminal (PIN 5). The input signal reemerges from the transceiver 150 at PIN 3 at the appropriate RS-232 level, and is subsequently transferred to the peripheral device along conductor J6-2.

The RS-232 compatible data signals transmitted from the peripheral device to the host device along conductor J6-3 to input PIN 23 of the transceiver 150, are converted to TTL logic levels at PIN 22. The logic levels are then reconverted by the transceiver 150 at PIN 18 and exit the output PIN 1 at the appropriate RS-232 level. The signals pass through diode D11, which removes the negative voltage portion of the RS-232 signal, thus forming a pseudo RS-232 signal, typically in the voltage range of about 0 volts to about 9 volts. The signal is then transferred to the cable header along conductors J4-2 and J5-2. The cable header processes the signals in the same manner as that described above in relation to FIG. 3.

The cable 18 described above in conjunction with FIGS. 1-6 can be used in a variety of environments. In one exemplary example, the cable 18 can be employed in a hospital environment to assist in the treatment of patients. In one system environment, a bedside monitor can be connected to a series of identical drug infusion pumps, each pump responsible for administering a different drug to a patient, e.g., pump A administers dopamine and pump B administers heparin. The monitor communicates with the pumps by daisy-chaining a plurality of the cables 18 together, with each infusion pump attached to a respective cable. The bedside monitor, by selectively communicating with one of the pumps, can monitor and adjust the administration of the different drugs to the patient by periodically retrieving information from the drug infusion pumps via the cables.

Each cable is responsible for establishing a communication pathway between the monitor and the associated drug pump, e.g., between the bedside monitor and pump A, and for coordinating the flow of data therebetween. As the infusion pumps are identical, accurate and proper registration between the computer and selected infusion pumps are important to avoid the accidental administration of the incorrect drug and/or amount. The monitor can specifically request that dopamine be administered to the patient, despite the use of identical infusion pumps, by transmitting the proper password to the cables employed in the daisy-chained array. The cable having the proper password stored in memory then establishes a communication pathway between the monitor and the specific attached infusion pump. Consequently, data can be transferred between the bedside monitor and a specific pump.

In another exemplary example, the cable can be employed in conjunction with local area computer networks to allow a stand-alone computer terminal to access and to retrieve information from a specific remote database.

In yet another exemplary example, the cable 18 can also be utilized with a bedside monitor, a series of peripheral medical devices, and one or more local and/or remote databases. This elaborate integration of components allows a physician, via the bedside monitor, to access medical records in a specific database. The information obtained can be used to select a particular drug regiment. The bedside monitor can then automatically communicate with a specific attached medical device via the cable 18 according to the above described practice.

Those of ordinary skill will recognize that the cable 18 can be easily modified to be utilized with medical equipment that requires constant polling, which continually ensures the peripheral device that a communication line exists. In one embodiment, the controller of FIG. 2 or 5 can be reconfigured to allocate a specific portion of the controller's memory to handle this polling requirement. If additional memory is necessary to accommodate the polling feature of the attached medical device, then different controllers having a larger resident memory capacity can be employed.

Those of ordinary skill will recognize that modifications of the illustrated circuitry exist without departing from the spirit and scope of the invention. For example, most types of microcontrollers or processors can be employed, as well as various types of transceivers. Additionally, the communication pathways established may be electrical conductors or fiber optic cables. Other modifications include employing infrared transmitters and/or receivers to allow a host device access to a specific peripheral device. One embodiment would include an infrared transmitter in conjunction with a host device, and an infrared receiver associated with the cable header and/or cable.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall there between.

The following text constitutes computer sotfware listing A that is stored within the memory of the controller of FIG. 2 of the invention. These listings are:

```
001     List P = 16C54
002             **************
003     0001    RECV_PN   EQU 1
004     0003    ACK_PN    EQU 3
005     0003    GRN_PN    EQU 3
006     0002    PWR_PN    EQU 2
007     0004    RED_PN    EQU 4
008     0000    BYPASS_PN EQU 0
009             **************
010     0005    PORT_A    EQU 05
011     0006    PORT_B    EQU 06
012     0008    EEPRM_DATA1   EQU 08
013     0009    EEPRM_DATA2   EQU 09
014     000A    EEPRM_DATA3   EQU 0A
015     000B    EEPRM_DATA4   EQU 0B
016     000C    EEPRM_DATA5   EQU 0C
017     000D    EEPRM_DATA6   EQU 0D
018     000E    EEPRM_DATA7   EQU 0E
019     000F    EEPRM_DATA8   EQU 0F
020     0010    RECV_DATA EQU 10
021     0011    RECV_DATA_BIT EQU 11
022     0012    RECV_DATA_BYTE EQU12
023     0013    DELAY_TIME EQU 13
024     0014    TEMP   EQU 14
025     0015    TEMP2 EQU 15
026     0016    EEPRM_ADDRESS EQU 16
027     0017    EEPRM_DATA EQU 17
028     0018    OP_CODE     EQU 18
029     0019    CIMD_STATUS EQU 19
                ;00=INACTIVE
                ;01=ACTIVE
032     001A    ACK_BYTE    EQU 1A
033     001B    MESSAGE_OUT EQU 1B
034     001C    REPLY_BIT EQU 1C
035     001D    REPLY_BYTE EQU 1D
036     001E    SET_UP EQU 1E
037             ;
038     0000    ORG    0
039             ;
040             START
041     0000 0C08  MOVLW 0X08
042     0001 0002  OPTION
043     0002 0C00  MOVLW 0X00
044     0003 0032  MOVWF RECV_DATA_BYTE
045     0004 0030  MOVWF RECV_DATA
046     0005 0039  MOVWF CIMD_STATUS
047     0006 007E  CLRF SET_UP
048     0007 047E  BCF SET_UP,GRN_PN
```

```
049   0008 045E BCF SET_UP,PWR_PN
050   0009 021E MOVFW SET_UP
051   000A 0005 TRIS PORT_A
052   000B 007E CLRF SET_UP
053   000C 047E BCF SET_UP,GRN_PN
054   000D 055E BSF SET_UP,PWR_PN
055   000E 021E MOVFW SET_UP
056   000F 0025 MOVWF PORT_A
057   0010 007E CLRF SET_UP
058   0011 047E BCF SET_UP,ACK_PN
059   0012 049E BCF SET_UP,RED_PN
060   0013 053E BSF SET_UP,RECV_PN
061   0014 051E BSF SET_UP,BYPASS_PN
062   0015 021E MOVFW SET_UP
063   0016 0006 TRIS PORT_B
064   0017 007E CLRF SET_UP
065   0018 047E BCF SET_UP,ACK_PN
066   0019 059E BSF SET_UP,RED_PN
067   001A 021E MOVFW SET_UP
068   001B 0026 MOVWF PORT_B
069   001C 0A27 GOTO BEGIN
070        DELAY
071   001D 0033 MOVWF DELAY_TIME
072        D_PT2
073   001E 02F3 DECFSZ DELAY_TIME
074   001F 9A1E GOTO D_PT2;NO MATCH
075   0020 0800 RETLW 0X00
076        DO_ON
077   0021 0565 BSF PORT_A,GRN_PN
078   0022 0486 BDF PORT_B,RED_PN
079   0023 0800 RETLW 0X00
080        DO_OFF
081   0024 0465 BCF PORT_A,GRN_PN
082   0025 0586 BSF PORT_B,RED_PN
083   0026 0800 RETLW 0X00
084        ;_____
085        ;_____
086        BEGIN
087   0027 0004 CLRWDT
088        LOAD_EEPRM
089   0028 0C4D MOVLW 0X4D;ASCI'M'
090   0029 0028 MOVWF EEPRM_DATA1
091   002A 0C49 MOVLW 0X49;ASCI'I'
092   002B 0029 MOVWF EEPRM_DATA2
093   002C 0C43 MOVLW 0X43;ASCI'C'
094   002D 002A MOVWF EEPRM_DATA3
095   002E 0C55 MOVLW 0X55;ASCI'U'
096   002F 002B MOVWF EEPRM_DATA4
097   0030 0C23 MOVLW 0X23;ASCI'#'
098   0031 002C MOVWF EEPRM_DATA5
099   0032 0C38 MOVLW 0X38;ASCI'8'
100   0033 002D MOVWF EEPRM_DATA6
101   0034 0C30 MOVLW 0X30;ASCI'0'
102   0035 002E MOVWF EEPRM_DATA7
103   0036 0C31 MOVLW 0X31;ASCI'I'
104   0037 002F MOVWF EEPRM_DATA8
105        PRE_WAIT
106   0038 0C00 MOVLW 0X00
107   0039 0032 MOVWF RECV_DATA_BYTE
```

```
108      WAIT_FOR_START_BIT
109 003A 0004 CLRWDT
110 003B 0726 BTFSS PORT_B,RECV_PN
111 003C 0A3A GOTO WAIT_FOR_START_BIT
112 003D 0000 NOP
113 003E 0C30 MOVLW 0X30
114 003F 091D CALL DELAY;1.5 BAUD
115      READING_DATA_BITS
116 0040 0C08 MOVLW 0X08
117 0041 0031 MOVWF RECV_DATA_BIT
118      RDB_PT1
119 0042 0330 RRF RECV_DATA
120 0043 0726 BTFSS PORT_B,RECV_PN
121 0044 05F0 BSF RECV_DATA,7
122 0045 0626 BTFSC PORT_B,RECV_PN
123 0046 04F0 BCF RECV_DATA,7
124 0047 0C1F MOVLW 0X1F;1 BAUD
125 0048 091D CALL DELAY
126 0049 02F1 DECFSZ RECV_DATA_BIT
127 004A 0A42 GOTO RDB_PT1
128      COMPARE_RECV_DATA
129 004B 02B2 INCF RECV_DATA_BYTE
130 004C 0212 MOVFW RECV_DATA_BYTE
131 004D 01E2 ADDWF2,1
132 004E 0000 NOP
133 004F 0A58 GOTO CMP_DATA1
134 0050 0A5A GOTO CMP_DATA2
135 0051 0A5C GOTO CMP_DATA3
136 0052 0A5E GOTO CMP_DATA4
137 0053 0A60 GOTO CMP_DATA5
138 0054 0A62 GOTO CMP_DATA6
139 0055 0A64 GOTO CMP_DATA7
140 0056 0A66 GOTO CMP_DATA8
141 0057 0A68 GOTO CMP_N;SEE IF ON
142      CMP_DATA1
143 0058 0208 MOVFW EEPRM_DATA1
144 0059 0A71 GOTO COMPARING
145      CMP_DATA2
146 005A 0209 MOVFW EEPRM_DATA2
147 005B 0A71 GOTO COMPARING
148      CMP_DATA3
149 005C 020A MOVFW EEPRM_DATA3
150 005D 0A71 GOTO COMPARING
151      CMP_DATA4
152 005E 020B MOVFW EEPRM_DATA4
153 005F 0A71 GOTO COMPARING
154      CMP_DATA5
155 0060 020C MOVFW EEPRM_DATA5
156 0061 0A71 GOTO COMPARING
157      CMP_DATA6
158 0062 020D MOVFW EEPRM_DATA6
159 0063 0A71 GOTO COMPARING
160      CMP_DATA7
161 0064 020E MOVFW EEPRM_DATA7
162 0065 0A71 GOTO COMPARING
163      CMP_DATA8
164 0066 020F MOVFW EEPRM_DATA8
165 0067 0A71 GOTO COMPARING
166      CMP_N
```

-31-

```
167  0068  0C4E MOVLW 0X4E;ASCI'N'
168  0069  0190 XORWF RECV_DATA,W
169  006A  0643 BTFSC 3,2
170  006B  0A7B GOTO SEND_ON_ACK;MATCH
171  006C  0C46 MOVLW 0X46;ASCI'F'
172  006D  0190 XORWF RECV_DATA,W
173  006E  0743 BTFSS 3,2
174  006F  0A38 GOTO PRE_WAIT;NO MATCH
175  0070  0A75 GOTO SEND_OFF_ACK
176        COMPARING
177  0071  0190 XORWF RECV_DATA,W
178  0072  0743 BTFSS 3,2
179  0073  0A38 GOTO PRE_WAIT;NO MATCH
180  0074  0A3A GOTO WAIT_FOR_START_BIT
181        SEND_OFF_ACK
182  0075  0419 BCF CIMD_STATUS,0
183  0076  0000 NOP;
184  0077  0000 NOP;
185  0078  0A7F GOTO SEND_ID_PROCEDURE
186  0079  0000 NOP; GOTO PRE_WAIT
187  007A  0000 NOP; GOTO SEND_REPLY
188        SEND_ON_ACK
189  007B  0519 BSF CIMD_STATUS,0;1=ACTIVE
190  007C  0921 CALL DO_ON;
191  007D  0000 NOP;
192  007E  0000 NOP; GOTO PRE_WAIT
193        SEND_ID_PROCEDURE
194  007F  0C00 MOVLW 0X00
195  0080  003D MOVWF REPLY_BYTE
196        SIP_PT1
197  0081  02BD INCF REPLY_BYTE
198  0082  021D MOVFW REPLY_BYTE
199  0083  01E2 ADDWF 2,1
200  0084  0000 NOP
201  0085  0A91 GOTO REPLY_BYTE1
202  0086  0A93 GOTO REPLY_BYTE2
203  0087  0A95 GOTO REPLY_BYTE3
204  0088  0A97 GOTO REPLY_BYTE4
205  0089  0A99 GOTO REPLY_BYTE5
206  008A  0A9B GOTO REPLY_BYTE6
207  008B  0A9D GOTO REPLY_BYTE7
208  008C  0A9F GOTO REPLY_BYTE8
209  008D  0AA1 GOTO N_F_ENDING
210  008E  0AA5 GOTO A_ENDING
211  008F  0AA7 GOTO C_ENDING
212  0090  0AA9 GOTO K_ENDING
213        REPLY_BYTE1
214  0091  0208 MOVFW EEPRM_DATA1
215  0092  0AAB GOTO SEND_REPLY
216        REPLY_BYTE2
217  0093  0209 MOVFW EEPRM_DATA2
218  0094  0AAB GOTO SEND_REPLY
219        REPLY_BYTE3
220  0095  020A MOVFW EEPRM_DATA3
221  0096  0AAB GOTO SEND_REPLY
222        REPLY_BYTE4
223  0097  020B MOVFW EEPRM_DATA4
224  0098  0AAB GOTO SEND_REPLY
225        REPLY_BYTE5
```

-32-

```
226    0099  020C  MOVFW EEPRM_DATA5
227    009A  0AAB  GOTO SEND_REPLY
228          REPLY_BYTE6
229    009B  020D  MOVFW EEPRM_DATA6
230    009C  0AAB  GOTO SEND_REPLY
231          REPLY_BYTE7
232    009D  020E  MOVFW EEPRM_DATA7
233    009E  0AAB  GOTO SEND_REPLY
234          REPLY_BYTE8
235    009F  020F  MOVFW EEPRM_DATA8
236    00A0  0AAB  GOTO SEND_REPLY
237          N_F_ENDING
238    00A1  0C46  MOVLW 0X46;ASCI'F'
239    00A2  0619  BTFSC CIMD_STATUS,0
240    00A3  0C4E  MOVLW 0X4E;ASCI'N'
241    00A4  0AAB  GOTO SEND_REPLY
242          A_ENDING
243    00A5  0C41  MOVLW 0X41;ASCI'A'
244    00A6  0AAB  GOTO SEND_REPLY
245          C_ENDING
246    00A7  0C43  MOVLW 0X43;ASCI'C'
247    00A8  0AAB  GOTO SEND_REPLY
248          K_ENDING
249    00A9  0C4B  MOVLW 0X4B;ASCI'K'
250    00AA  0AAB  GOTO SEND_REPLY
251          SEND_REPLY
252    00AB  0004  CLRWDT
253    00AC  003B  MOVWF MESSAGE_OUT
254    00AD  027B  COMF MESSAGE_OUT,1
255    00AE  0C0D  MOVLW 0X0D
256    00AF  019D  XORWF REPLY_BYTE,W
257    00B0  0643  BTFSC 3,2
258    00B1  0AC4  GOTO ON_OFF;MATCHES
259    00B2  0C08  MOVLW 0X08
260    00B3  003C  MOVWF REPLY_BIT
261    00B4  0566  BSF PORT_B,ACK_PN;START BIT
262    00B5  0C1F  MOVLW 0X1F
263    00B6  091D  CALL DELAY
264          SR_PT1
265    00B7  071B  BTFSS MESSAGE_OUT,0
266    00B8  0466  BCF PORT_B,ACK_PN
267    00B9  061B  BTFSC MESSAGE_OUT,0
268    00BA  0566  BSF PORT_B,ACK_PN
269    00BB  0C1F  MOVLW 0X1F
270    00BC  091D  CALL DELAY
271    00BD  033B  RRF MESSAGE_OUT
272    00BE  02FC  DECFSZ REPLY_BIT
273    00BF  0AB7  GOTO SR_PT1
274    00C0  0466  BCF PORT_B,ACK_PN;STOP BIT
275    00C1  0C1F  MOVLW 0X1F
276    00C2  091D  CALL DELAY;1 BAUD
277    00C3  0A81  GOTO SIP_PT1
278          ON_OFF
279    00C4  0719  BTFSS CIMD_STATUS,0
280    00C5  0924  CALL DO_OFF
281    00C6  0A38  GOTO PRE_WAIT
282          0000  END
```

-33-

The following text constitutes computer software listing B that is stored within the remote memory module of FIGURE 5 of the invention. These listings are:

```
        Title    "CIMD10.ASM"
LIST P = 16C54
***************************
        RECV_PN    EQU   1
        ACK_PN     EQU   2
        GRN_PN     EQU   2
        RED_PN     EQU   3
        PWR_PN     EQU   0
***************************
        PORT_A              EQU 05
        PORT_B              EQU 06
        EEPRM_DATA1         EQU 08
        EEPRM_DATA2         EQU 09
        EEPRM_DATA3         EQU 0A
        EEPRM_DATA4         EQU 0B
        EEPRM_DATA5         EQU 0C
        EEPRM_DATA6         EQU 0D
        EEPRM_DATA7         EQU 0E
        EEPRM_DATA8         EQU 0F
        RECV_DATA           EQU 10
        RECV_DATA_BIT  EQU 11
        RECV_DATA_BYTE EQU 12
        DELAY_TIME EQU 13
        TEMP                EQU 14
        TEMP2               EQU 15
        EEPRM_ADDRESS  EQU 16
        EEPRM_DATA EQU 17
        OP_CODE             EQU 18
        CIMD_STATUS         EQU 19
           ;00=INACTIVE
           ;01=ACTIVE
        ACK_BYTE            EQU 1A
        MESSAGE_OUT         EQU 1B
        REPLY_BIT           EQU 1C
        REPLY_BYTE EQU 1D
        SET_UP  EQU 1E
;
        ORG         0
;
START
        MOVLW   0X00
        MOVWF   RECV_DATA_BYTE
        MOVWF   RECV_DATA
        MOVWF   CIMD_STATUS
        MOVLW   0X02
        OPTION
        CLRF    SET_UP
        BSF     SET_UP,RECV_PN
        BCF     SET_UP,ACK_PN
        MOVFW   SET_UP
        TRIS    PORT_A
```

-34-

```
        BCF    PORT_A,ACK_PN
        MOVLW  0X10
        TRIS   PORT_B
        CLRF   SET_UP
        BSF    SET_UP,RED_PN
        BSF    SET_UP,PWR_PN
        MOVFW  SET_UP
        MOVWF  PORT_B
        GOTO   BEGIN
DELAY
        MOVWF  DELAY_TIME
        CLRF   1
D_PT2
        MOVFW  DELAY_TIME
        XORWF  1,W
        BTFSS  3,2
        GOTO   D_PT2;NO MATCH
        RETLW  0X00
        RECV_EEPRM_DATA
        MOVLW  0X08
        MOVWF  TEMP
RED PT1
        RLF    EEPRM_DATA
        CALL   SET_CLK_HIGH_LOW
        BTFSS  PORT_B,4
        BCF    EEPRM_DATA,0
        BTFSC  PORT_B,4
        BSF    EEPRM_DATA,0
        DECFSZ TEMP
        GOTO   RED_PT1
        RETLW  0X00
SEND_OP_CODE
        MOVWF  OP_CODE
        MOVLW  0X08
        MOVWF  TEMP
        BSF    PORT_B,5
        CALL   SET_CLK_HIGH_LOW
        BCF    PORT_B,5
SOC_PT1
        BTFSS  OP_CODE,7
        BCF    PORT_B,5
        BTFSC  OP_CODE,7
        BSF    PORT_B,5
        RLF    OP_CODE
        CALL   SET_CLK_HIGH_LOW
        DECFSZ TEMP
        GOTO   SOC_PT1
        RETLW  0X00
SET_CLK_HIGH_LOW
        BSF    PORT_B,6
        NOP
        BCF    PORT_B,6
        RETLW  0X00
DO ON
        BCF    PORT_B,RED_PN
        BSF    PORT_B,GRN_PN
        RETLW  0X00

DO OFF
```

-35-

```
        BCF     PORT_B,GRN_PN
        BSF     PORT_B,RED_PN
        RETLW   0X00
;============================
;============================
BEGIN
  LOAD_EEPRM
        MOVLW   0X08
        MOVWF   TEMP2
        CLRF    EEPRM_ADDRESS
  LE_PT1
        MOVLW   0X08
        XORWF   EEPRM_ADDRESS,W
        BTFSC   3,2
        GOTO    WAIT_FOR_START_BIT
        BSF     PORT_B,7;SET CS HIGH
        CALL    SET_CLK_HIGH_LOW
        MOVLW   0X80 ;READ OP CODE
        MOVWF   OP_CODE
        MOVFW   EEPRM_ADDRESS
        ADDWF   OP_CODE
        MOVFW   OP_CODE
        CALL    SEND_OP_CODE
        CALL    RECV_EEPRM_DATA
        BCF     PORT_B,7;SET CS LOW
        BCF     PORT_B,6
        BCF     PORT_B,5
        MOVFW   EEPRM_ADDRESS
        ADDWF   2,1
        GOTO    STORE_EEPRM_DATA1
        GOTO    STORE_EEPRM_DATA2
        GOTO    STORE_EEPRM_DATA3
        GOTO    STORE_EEPRM_DATA4
        GOTO    STORE_EEPRM_DATA5
        GOTO    STORE_EEPRM_DATA6
        GOTO    STORE_EEPRM_DATA7
        GOTO    STORE_EEPRM_DATA8
  STORE_EEPRM_DATA1
        MOVFW   EEPRM_DATA
        MOVWF   EEPRM_DATA1
        GOTO    INC_EPRM_AD
  STORE_EEPRM_DATA2
        MOVFW   EEPRM_DATA
        MOVWF   EEPRM_DATA2
        GOTO    INC_EPPRM_AD
  STORE_EEPRM_DATA3
        MOVFW   EEPRM_DATA
        MOVWF   EEPRM_DATA3
        GOTO    INC_EPRM_AD
  STORE_EEPRM_DATA4
        MOVFW   EEPRM_DATA
        MOVWF   EEPRM_DATA4
        GOTO    INC_EPRM_AD
  STORE_EEPRM_DATA5
        MOVFW   EEPRM_DATA
        MOVWF   EEPRM_DATA5
        GOTO    INC_EPRM_AD
  STORE_EEPRM_DATA6
        MOVFW   EEPRM_DATA
```

-36-

```
        MOVWF   EEPRM_DATA6
        GOTO    INC_EPRM_AD
STORE_EEPRM_DATA7
        MOVFW   EEPRM_DATA
        MOVWF   EEPRM_DATA7
        GOTO    INC_EPRM_AD
STORE_EEEPRM_DATA8
        MOVFW   EEPRM_DATA
        MOVWF   EEPRM_DATA8
        GOTO    INC_EPRM_AD
INC_EPRM_AD
        INCF    EEPRM_ADDRESS
        GOTO    LE_PT1
PRE_WAIT
        MOVLW   0X00
        MOVWF   RECV_DATA_BYTE
    WAIT_FOR_START_BIT
        BTFSS   PORT_A,RECV_PN
        GOTO    WAIT_FOR_START_BIT
        NOP
        MOVLW   0X4C
        CALL    DELAY   ; 1.5 BAUD
READING_DATA_BITS
        MOVLW   0X08
        MOVWF   RECV_DATA_BIT
  RDB_PT1
        RRF     RECV_DATA
        BTFSS   PORT_A,RECV_PN
        BSF     RECV_DATA,7
        BTFSC   PORT_A,RECV_PN
        BCF     RECV_DATA,7
        MOVLW   0X32    ; 1 BAUD
        CALL    DELAY
        DECFSZ  RECV_DATA_BIT
        GOTO    RDB_PT1
COMPARE_RECV_DATA
        INCF    RECV_DATA_BYTE
        MOVFW   RECV_DATA_BYTE
        ADDWF   2,1
        NOP
        GOTO    CMP_DATA1
        GOTO    CMP_DATA2
        GOTO    CMP_DATA3
        GOTO    CMP_DATA4
        GOTO    CMP_DATA5
        GOTO    CMP_DATA6
        GOTO    CMP_DATA7
        GOTO    CMP_DATA8
        GOTOO   CMP_N   ;SEE IF ON
  CMP_DATA1
        MOVFW   EEPRM_DATA1
        GOTO    COMPARING
  CMP_DATA2
        MOVFW   EEPRM_DATA2
        GOTO    COMPARING
  CMP_DATA3
        MOVFW   EEPRM_DATA3
        GOTO    COMPARING
  CMP_DATA4
```

```
            MOVFW    EEPRM__DATA4
            GOTO     COMPARING
CMP__DATA5
            MOVFW    EEPRM__DATA5
            GOTO     COMPARING
CMP__DATA6
            MOVFW    EEPRM__DATA6
            GOTO     COMPARING
CMP__DATA7
            MOVFW    EEPRM__DATA7
            GOTO     COMPARING
CMP__DATA8
            MOVFW    EEPRM__DATA8
            GOTO     COMPARING
CMP__N
            MOVLW    0X4E;ASCI 'N'
            XORWF    RECV__DATA,W
            BTFSC    3,2
            GOTO     SEND__ON__ACK;MATCH
            MOVLW    0X46;ASCI 'F'
            XORWF    RECV__DATA,W
            BTFSS    3,2
            GOTO     PRE__WAIT; NO MATCH
            GOTO     SEND__OFF__ACK
COMPARING
            XORWF    RRECV__DATA,W
            BTFSS    3,2
            GOTO     PRE_WAIT;NO MATCH
            GOTO     WAIT__FOR__START__BIT
    SEND__OFF__ACK
            BCF      CIMD__STATUS,0
            NOP;
            NOP;
            GOTO     SEND ID__PROCEDURE
NOP;              GOTO   PRE__WAIT
NOP;              GOTO   SEND__REPLY
    SEND__ON__ACK
            BSF CIMD__STAUS,0;1=ACTVE
            CALL  DO__ON;
NOP;
NOP;              GOTO   PRE__WAIT
SEND__ID__PROCEDURE
            MOVLW    0X00
            MOVWF    REPLY__BYTE
    SIP__PT1
            INCF     REPLY__BYTE
            MOVFW    REPLY__BYTE
            ADDWF    2,1
            NOP
            GOTO     REPLY__BYTE1
            GOTO     REPLY__BYTE2
            GOTO     REPLY__BYTE3
            GOTO     REPLY__BYTE4
            GOTO     REPLY__BYTE5
            GOTO     REPLY__BYTE6
            GOTO     REPLY__BYTE7
            GOTO     REPLY__BYTE8
            GOTO     N__F__ENDING
            GOTO     A__ENDING
```

-38-

```
        GOTO    C_ENDING
        GOTO    K_ENDING
REPLY_BYTE1
        MOVFW   EEPRM_DATA1
        GOTO    SEND_REPLY
REPLY_BYTE2
        MOVFW   EEPRM_DATA2
        GOTO SEND_REPLY
REPLY_BYTE3
        MOVFW   EEPRM_DATA3
        GOTO SEND_REPLY
REPLY_BYTE4
        MOVFW   EEPRM_DATA4
        GOTO SEND_REPLY
REPLY_BYTE5
        MOVFW   EEPRM_DATA5
        GOTO SEND_REPLY
REPLY_BYTE6
        MOVFW   EEPRM_DATA6
        GOTO SEND_REPLY
REPLY_BYTE7
        MOVFW   EEPRM_DATA7
        GOTO SEND_REPLY
REPLY_BYTE8
        MOVFW   EEPRM_DATA8
        GOTO SEND_REPLY
N_F_ENDING
        MOVLW   0X46'ASCI 'F'
        BTFSC   CIMD_STATUS,0
        MOVLW   0X4E;ASCI 'N'
        GOTO    SEND_REPLY
A_ENDING
        MOVLW   0X41;ASCI 'A'
        GOTO    SEND_REPLY
C_ENDING
        MOVLW   0X43;ASCI 'C'
        GOTO    SEND_REPLY
K_ENDING
        MOVLW   0X4b;ASCI'K'
        GOTO    SEND_REPLY
SEND_REPLY
        MOVWF   MESSAGE_OUT
        COMF    MESSAGE_OUT,1
        MOVLW   0X0D
        XORWF   REPLY_BYTE,W
        BTFSC   3,2
        GOTO    ON_OFF;MATCHES
        MOVLW   0X08
        MOVWF   REPLY_BIT
        BSF     PORT_A,ACK_PN;START BIT
        MOVLW   0X32
        CALL    DELAY
SR_PT1
        BTFSS   MESSAGE_OUT,0
        BCF     PORT_A,ACK_PN
        BTFSC   MESSAGE_OUT,0
        BSF     PORT_A,ACK_PN
        MOVLW   0X32
        CALL    DELAY
```

-39-

```
        RRF     MESSAGE_OUT
        DECFSZ  REPLY_BIT
        GOTO    SR_PT1
        BCF     PORT_A,ACK_PN;STOP BIT
        MOVLW   0X32
        CALL    DELAY; 1 BAUD
        GOTO    SIP_PT1
ON_OFF
        BTFSS   CIMD_STATUS,0
        CALL    DO_OFF
        GOTO    PRE_WAIT
END
```

Having described the invention, what is claimed as new and desired to be secured by Letters Patent is:

1. A cable, for use with a host device and at least one peripheral device, for establishing a data communication pathway therebetween, said host device generating in one mode of operation an identifier signal designating a selected peripheral device, said cable comprising at least one conductor for carrying said identifier signal, at least one controller in communication with said conductor and having at least one respective associated peripheral device, for controlling a flow of data signals between the host and peripheral devices, each said controller being responsive to said identifier signal designating said associated peripheral device, for establishing a bi-directional communication pathway between the host device and the selected peripheral device, and for allowing data to be bi-directionally exchanged between the host and peripheral devices upon establishment of said pathway, and a cable header in circuit with said controller and having transceiver means for converting a data signal traveling along said communication pathway into a format compatible with the host device, and means for supplying back-up power to said cable.

2. A cable, for use with a host device and at least one peripheral device, for establishing a data communication pathway therebetween, said host device generating in one mode of operation an identifier signal designating a selected peripheral device, said cable comprising at least one conductor for carrying said identifier signal, at least one controller in communication with said conductor and having at least one respective associated peripheral device, for controlling a flow of data signals between the host and peripheral devices, each said controller being responsive to said identifier signal designating said associated peripheral device, for establishing a bi-directional communication pathway between the host device and the selected peripheral device, and for allowing data to be bi-directionally exchanged between the host and peripheral devices upon establishment of said pathway, and a voltage regulator in electrical communication with said at least one controller for supplying power thereto, said voltage regulator being connected so as to receive power selectively from a plurality of power sources.

3. A remotely programmable cable, for use with a host device and a peripheral device, for establishing a data communication pathway therebetween, said host device generating an identifier signal indicative of a selected peripheral device, wherein the identifier signal is representative of a value associated with said selected peripheral device, said cable comprising memory means for storing identification data representative of an identifier associated with a selected peripheral device, at least one controller, in electrical communication with said memory means, for controlling a flow of data signals between the host device and the peripheral device, each said controller being responsive to said identifier signal designating a respective associated peripheral device for establishing a bi-directional communication pathway between the host device and the selected peripheral device, and for allowing data to be bi-directionally exchanged between the host and peripheral devices upon establishment of said pathway, and a cable header in circuit with said controller and having transceiver means for converting a data signal traveling along said communication pathway into a format compatible with the host device, and means for supplying back-up power to said cable.

4. A remotely programmable cable, for use with a host device and a peripheral device, for establishing a data communication pathway therebetween, said host device generating an identifier signal indicative of a selected peripheral device, wherein the identifier signal is representative of a value associated with said selected peripheral device, said cable comprising memory means for storing identification data representative of an identifier associated with a selected peripheral device, at least one controller, in electrical communication with said memory means, for controlling a flow of data signals between the host device and the peripheral device, each said controller being responsive to said identifier signal designating a respective associated peripheral device for establishing a bi-directional communication pathway between the host device and the selected peripheral device, and for allowing data to be bi-directionally exchanged between the host and peripheral devices upon establishment of said pathway, and a voltage regulator in electrical communication with said at least one controller for supplying power thereto, said voltage regulator being connected so as to receive power selectively from a plurality of power sources.

5. A cable for establishing a communication pathway between a host device and at least one peripheral device, said host device including means for generating an identifier signal indicative of a selected peripheral device and a selected command signal designating a selected pathway condition, said cable comprising at least one conductor capable of carrying said identifier signal, insulation means disposed about said conductor for electrically insulating said conductor, control means, in communication with said conductor and responsive to said identifier signal and said command signal, for selectively controlling a flow of data signals, said control means including memory means for storing identification data representative of a selected peripheral device associated with said cable, and comparison means for comparing said identifier signal generated by said host device with said identification data stored in said memory means, said control means further including means for establishing a bi-directional communication pathway between said host device and said selected peripheral device when said identifier signal matches said identification data, thereby allowing said data signals to pass bi-directionally therebetween upon establishment of said data pathway, said control means further opening said bi-directional communication pathway in response to an open command signal designating an open pathway condition and closing said communication pathway in response to a close command signal designating a closed pathway condition, daisy-chain means for allowing the cable to be connected in a daisy-chain array with one or more cables, housing means coupled to said conductors for housing said control means, and a cable header in circuit with said controller and having transceiver means for convening a data signal traveling along said communication pathway into a format compatible with the host device, and means for supplying back-up power to said cable.

* * * * *